United States Patent
Vorfeld et al.

(10) Patent No.: US 11,000,149 B2
(45) Date of Patent: May 11, 2021

(54) CAPSULE FOR CLEANING A BEVERAGE PREPARATION MACHINE AND METHOD FOR CLEANING A BREWING CHAMBER

(71) Applicant: MELITTA SINGLE PORTIONS GMBH & CO. KG, Minden (DE)

(72) Inventors: Udo Vorfeld, Herford (DE); Jan Pahnke, Minden (DE)

(73) Assignee: MELITTA SINGLE PORTIONS GMBH & CO. KG, Minden (DE)

( * ) Notice: Subject to any disclaimer, the term of this patent is extended or adjusted under 35 U.S.C. 154(b) by 180 days.

(21) Appl. No.: 15/750,173

(22) PCT Filed: Aug. 17, 2016

(86) PCT No.: PCT/EP2016/069499
§ 371 (c)(1),
(2) Date: Feb. 2, 2018

(87) PCT Pub. No.: WO2017/050492
PCT Pub. Date: Mar. 30, 2017

(65) Prior Publication Data
US 2018/0220840 A1  Aug. 9, 2018

(30) Foreign Application Priority Data

Sep. 23, 2015  (DE) ..................... 10 2015 116 088.9
Mar. 10, 2016  (DE) ..................... 10 2016 104 407.5

(51) Int. Cl.
| | |
|---|---|
| *A47J 31/60* | (2006.01) |
| *A47J 31/44* | (2006.01) |
| *B65D 65/46* | (2006.01) |
| *B65D 85/804* | (2006.01) |

(52) U.S. Cl.
CPC ........... *A47J 31/60* (2013.01); *A47J 31/4492* (2013.01); *B65D 65/46* (2013.01); *B65D 85/8043* (2013.01); *B65D 2203/00* (2013.01)

(58) Field of Classification Search
None
See application file for complete search history.

(56) References Cited

U.S. PATENT DOCUMENTS

2013/0014648 A1*  1/2013  Rognon ............. A47J 31/3623
99/280

FOREIGN PATENT DOCUMENTS

| CN | 102939253 A | 2/2013 |
|---|---|---|
| CN | 104661932 A | 5/2015 |
| DE | 4192762 C2 | 1/1993 |
| DE | 20 2005 021174 U1 | 6/2007 |
| DE | 202005021174 U1 | 6/2007 |

(Continued)

OTHER PUBLICATIONS

International Search Report for PCT/EP2016/069499, dated Jan. 3, 2017, and English Translation thereof.

(Continued)

*Primary Examiner* — Rita P Adhlakha
(74) *Attorney, Agent, or Firm* — FisherBroyles, LLP; Robert Kinberg

(57) ABSTRACT

A capsule for cleaning a beverage preparation machine includes a container which is sealed at one end by a removable cover and contains at least one cleaning agent. A screen or grating located beneath the cover holds the cleaning agent within the container.

12 Claims, 3 Drawing Sheets

(56) References Cited

FOREIGN PATENT DOCUMENTS

| | | |
|---|---|---|
| DE | 102010044251 A1 | 1/2012 |
| DE | 10 2012 011 204 A1 | 12/2013 |
| DE | 102012011204 A1 | 12/2013 |
| EP | 2 510 805 A2 | 10/2012 |
| EP | 2510805 A2 | 10/2012 |
| EP | 2 604 547 A1 | 6/2013 |
| EP | 2604547 A1 | 6/2013 |
| JP | 2015525588 A | 9/2015 |
| WO | 2006/137737 A2 | 12/2006 |
| WO | 2011141535 A1 | 11/2011 |
| WO | 2013/166615 A1 | 11/2013 |
| WO | 2013/188246 A2 | 12/2013 |
| WO | 2014/001564 A1 | 1/2014 |
| WO | 2014/020492 A1 | 2/2014 |
| WO | 2014/128205 A1 | 8/2014 |
| WO | 2014/202694 A1 | 12/2014 |
| WO | 2015/006367 A2 | 1/2015 |
| WO | 2015055849 A1 | 4/2015 |

OTHER PUBLICATIONS

Written Opinion for PCT/EP2016/069499, dated Jan. 3, 2017.
The First Chinese Office Action in related Chinese Patent Application No. 201680055689.5, dated Jan. 28, 2019, 7 pages.
Indian Examination Report in corresponding Indian Patent Application No. 201847014724, dated Aug. 10, 2020, 3 pages with an english translation.
Japanese Search Report in corresponding Japanese Patent Application No. 2018-515215, date of drafting Jul. 7, 2020, 8 pages with Google English translation.

\* cited by examiner

CAPSULE FOR CLEANING A BEVERAGE PREPARATION MACHINE AND METHOD FOR CLEANING A BREWING CHAMBER

CROSS-REFERENCE TO RELATED APPLICATIONS

This application is a U.S. National Stage Application of International Patent Application No. PCT/EP2016/069499, filed Aug. 17, 2016, which claims benefit of German Patent Application No. 10 2015 116 088.9, filed Sep. 23, 2015, and German Patent Application No. 10 2016 104 407.5, filed Mar. 10, 2016.

TECHNICAL FIELD

The present invention relates to a capsule for cleaning a beverage preparation machine, comprising a container which is sealed at an upper side via a removable cover and contains at least one cleaning agent, and a method for cleaning a brewing chamber of a beverage preparation machine.

BACKGROUND OF THE INVENTION

DE 10 2012 011 204 A1 discloses a container for introduction into the capsule receptacle of a beverage machine, wherein a cleaning agent is provided in the container. The container is closed and is cut or pierced for the cleaning process to introduce hot water into the capsule. When exceeding a predetermined pressure, the dissolved cleaning agent is then flushed through openings from the capsule into a brewing chamber of the beverage machine and can provide cleaning there. It is disadvantageous in this capsule that the cleaning agent can escape when said capsules is accidentally opened. In addition, this capsule can only be used for machines in which means for piercing or cutting the capsule are provided. As a result, dosage of the cleaning agent can be set only with difficulty.

WO2014/128205 discloses a portion capsule having a base element made of a liquid-impermeable material in which a shell member having a raw material is arranged. A peelable sealing film can be provided on the base element above an opening.

From WO2015/006367 a container with a cleaning agent is known, which can be inserted into a machine for beverage preparation for cleaning. On the container, a cover may be releasably secured to produce access to the cleaning agent. The cover closes an opening of the container and after removing the cover, the cleaning agent can escape from the opening. Further protection of the user from contact with the cleaning agent is not provided.

SUMMARY OF THE INVENTION

It is therefore an object of the present invention to provide a capsule for cleaning a beverage preparation machine and a method for cleaning a brewing chamber of a beverage preparation machine, which ensure a simple and safe handling of the cleaning process and allow accurate dosing of the cleaning agent.

The capsule according to the invention comprises a container which is closed on one side via a detachable cover and contains at least one cleaning agent, wherein a screen or mesh or also a water-soluble film may be provided on the container below the cover, by which the cleaning agent is held within the container. The screen, mesh or the water-soluble film in this case cover an opening of the container and are fixed to the outwardly projecting edge. This allows the user to remove the cover prior to the cleaning operation in order to insert the capsule into the beverage preparation machine. The cleaning agent is unable to fall out of the capsule due to the screen or mesh or the water-soluble film, so that safe handling is ensured, even if the container is not arranged with the opening on top, so that the user is protected against the cleaning agent. The release of the cover merely provides access to the screen or mesh or water-soluble film that holds the cleaning agent in the container and then allows the capsule to be flushed with a liquid, such as hot water.

The screen or mesh is therefore preferably permeable to water in order to allow dissolving of the cleaning agent by inflow of water into the container. As a result, a comparatively accurate dosage is ensured, since the dissolving of the cleaning agent takes place in a predetermined sequence.

The cleaning agent may be formed for example as a cleaning tablet. The cleaning tablet may contain several active substances which, when dissolved, take effect in a time-delayed manner one after the other. To accelerate the dissolving process, the cleaning agent may also be powder-like or arranged as granules in the container.

The capsule may have at least one identification means with an inlet surface and an exit surface for light, so that a beverage preparation machine can detect whether it is a capsule with a cleaning agent or a capsule with an extraction material for the preparation of a beverage. The identification means can be provided at a bottom of the container. This allows an automatic start of a cleaning program after inserting the capsule.

In the method according to the invention for cleaning a brewing chamber of a beverage preparation machine, first a cover is removed on a capsule with the cleaning agent in order to then position the capsule on or in the brewing chamber. Subsequently, hot water is introduced into the brewing chamber and the cleaning agent is dissolved in the capsule. The dissolved cleaning agent can then act in the brewing chamber. Subsequently, the brewing chamber is rinsed. As a result, a targeted dosage of the cleaning agent can be made, and the handling when cleaning the brewing chamber is not prone to errors.

The introduction of the hot water is not carried out in this case by a feed channel which is injected into the capsule, but by an inlet to the brewing chamber, in particular at an upper side of the brewing chamber. The water supply thus takes place substantially without pressure, so that the requirements placed on the seals to seal the capsule are lower compared to cleaning at higher pressure than the ambient pressure.

The exposure time of the dissolved cleaning agent after the introduction of the hot water is preferably at least 1 minute, in particular between 2 minutes and 6 minutes. It is also possible to extend the exposure time even more. As a result of the exposure time which is long compared to a through-flow of cleaning agent, the dosage of the cleaning agent can be kept low because the dissolved cleaning agent has more time for the cleaning process than cleaning in a continuous process. During the exposure time, the filling level of the cleaning agent dissolved in water can be substantially constant in this case in the brewing chamber. As a result, all areas to be cleaned can be reached over the entire surface, in particular also in brewing chambers with a volume greater than or equal to 100 ml.

The rinsing of the chamber preferably takes place with the capsule positioned on or in the brewing chamber. As a result, the brewing chamber is filled when dissolving the cleaning agent and can then be cleaned. The capsule is not perforated in this case and the introduction of hot water takes place via the screen, mesh or the at least partially dissolved film. Since the capsule is not perforated by a puncture, no leakage problems occur at a perforation. The capsule is sealed against the brewing chamber only in the region of the edge.

The cleaning agent may then contain at least two active ingredients which are dissolved in a time-delayed manner. This allows the cleaning rate to be improved. The final rinse can be carried out after ejection of the capsule.

The capsule is preferably positioned at a lateral opening on the brewing chamber. Before or after the positioning of the capsule, an automatic detection of the capsule by means of a light source and at least one light detector can then take place, which interact with identification means on the capsule. By detecting the capsule, an automatic cleaning program can then be started.

BRIEF DESCRIPTION OF THE DRAWINGS

The invention will be explained in more detail below by using an exemplary embodiment with reference to the accompanying drawings, wherein.

DETAILED DESCRIPTION OF THE INVENTION

Figure 1:
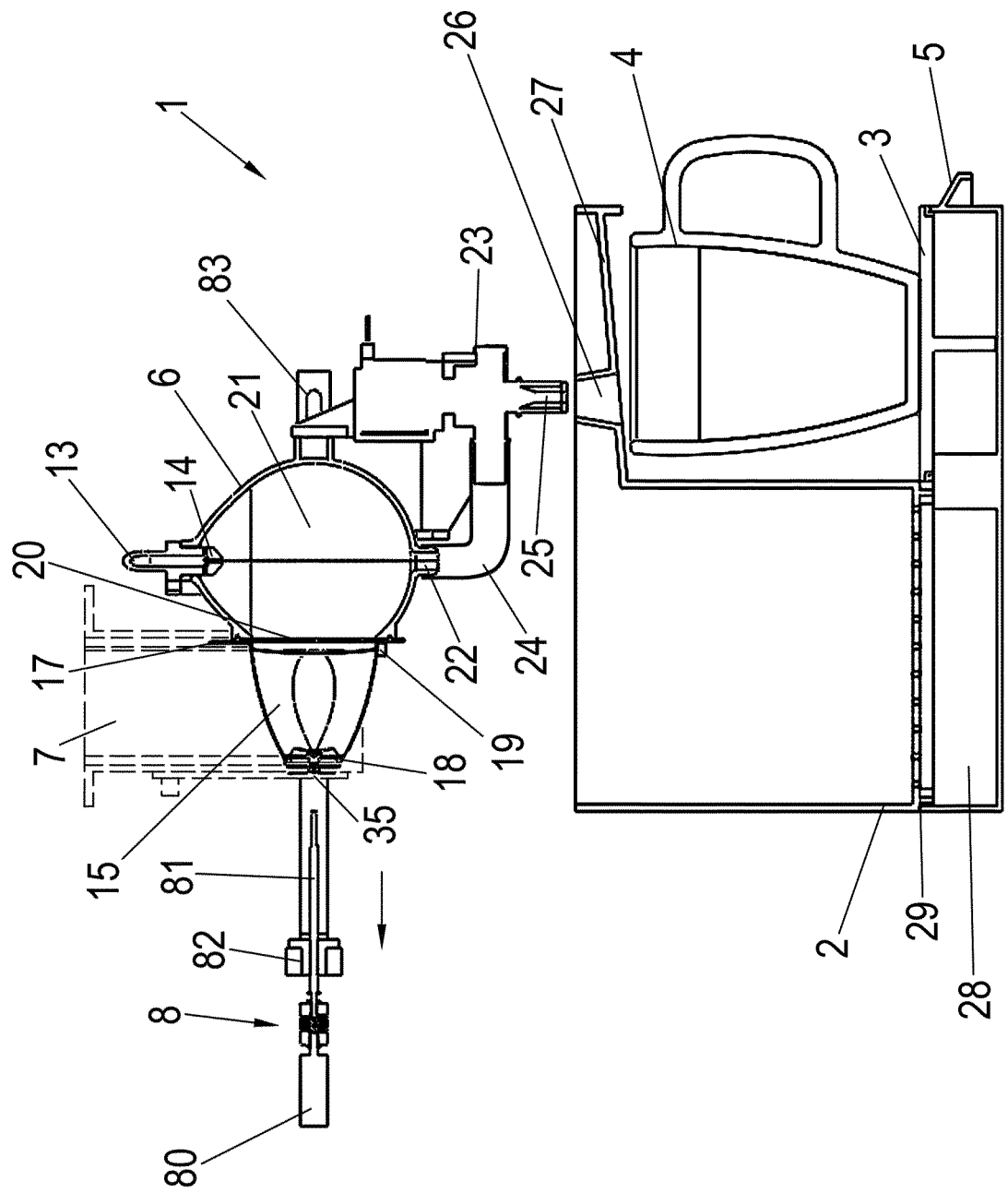
FIG. 1 shows a schematic view of a beverage preparation machine according to the invention with inserted capsule.

A device 1 for the preparation of brewed beverages comprises a removable collecting container 2, which is arranged in a housing. A support 3 with openings for parking a vessel 4 is arranged on the collecting container 2. Below the support 3, a handle portion 5 to pull out the collecting container 2 is provided.

The device 1 for the preparation of brewed beverages further comprises a brewing chamber 6, which is provided next to an insertion chute 7 for capsules.

As shown in FIG. 1, there is the insertion chute 7 for capsules between the brewing chamber 6 and a drive device 8. The brewing chamber 6 can be moved relative to the insertion chute 7 via the drive device 8. For this purpose, an electric motor 80 is provided, which drives a spindle 81 via a gear on which a spindle nut 82 is non-rotatably mounted. By turning the spindle 81, arms connected to the spindle nut 82 are moved linearly along a guide 83. The arms surround the brewing chamber 6 on opposite sides and can move said chamber linearly.

The device 1 for the preparation of brewed beverages further comprises a tank (not shown) for fresh water, which may be designed to be removable. The tank is connected to a pump, by means of which water is conveyed to a heating device, which is connected to an inlet line 13 above the brewing chamber 6.

In the insertion chute 7, a capsule 15 is arranged, which is cup-shaped and has on one side an opening which is closed with a screen. The screen 31 is fixed to an edge 16, which is formed asymmetrically and on one side has a protruding section 17 with a positioning means. The capsule 15 is thus inserted in a predetermined position and orientation into the insertion chute 7, which has a corresponding recess with guide means for the positioning of the capsule 15. On the side opposite the opening, the capsule 15 has a bottom 18 on which markings for identifying the capsule 15 are arranged. By reading the coding of the capsule 15 on the device, the filling amount of hot water for the brewing chamber 6, the temperature and the dwell time can be adjusted by a controller. It is also possible to control other parameters via the coding.

Figure 2:
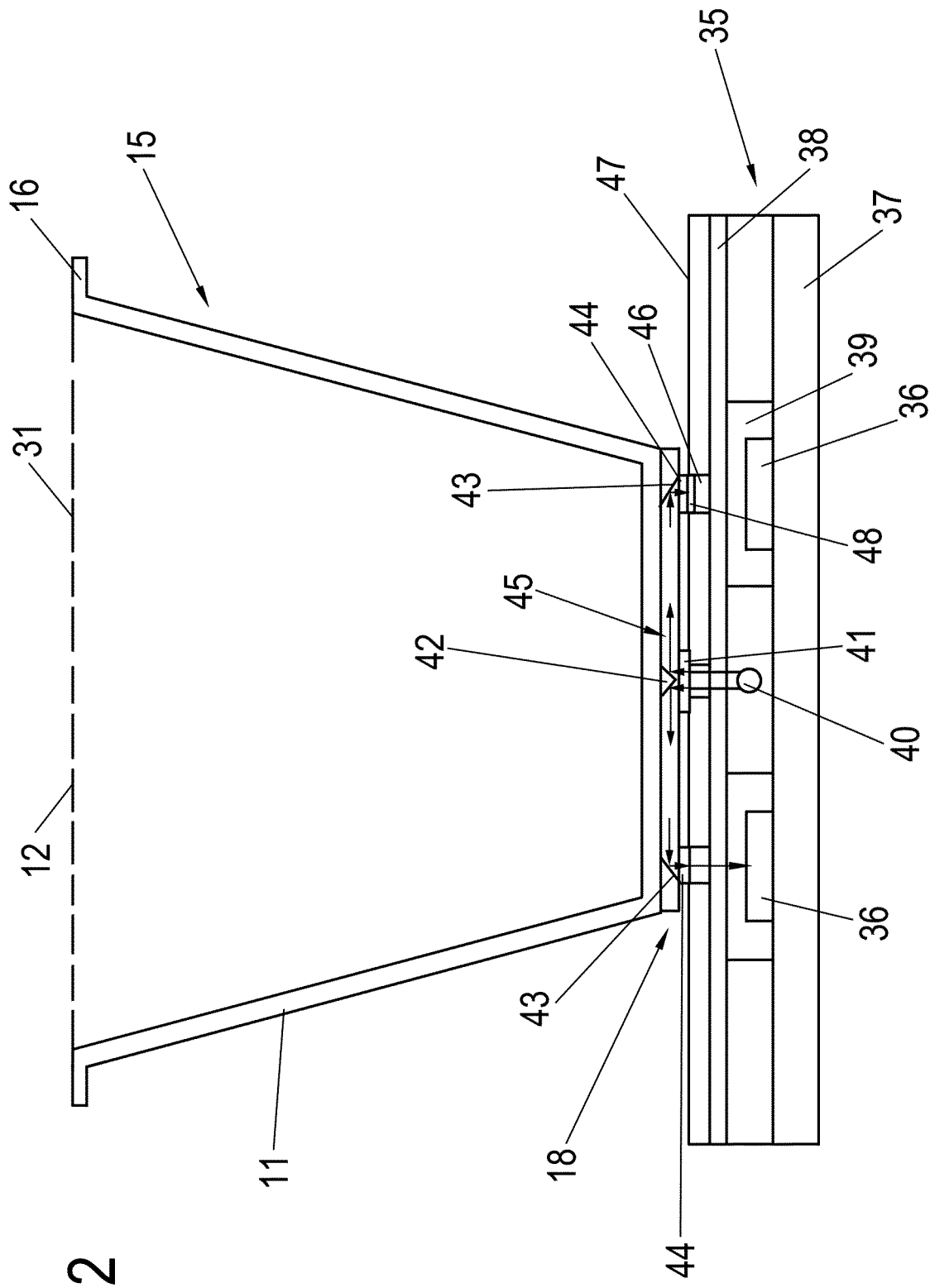
FIG. 2 shows a schematic view of a capsule with a device for detecting the capsule.

For the brewing process, the capsule 15 is first inserted into the chute 7. The capsule 15 slides down until it is arranged at a lateral opening of the brewing chamber 6. For this purpose, holders 19 are provided on the outside of the brewing chamber 6, which prevent the capsule 15 from downwardly slipping out. In FIG. 1, the brewing position is shown into which the brewing chamber 6 is moved via the electric motor 80 after inserting the capsule 15, as shown by the arrow. A seal is thus pressed adjacent to the opening at the brewing chamber 6 against the edge 16 (FIG. 2) of the capsule 15. The capsule 15 and an interior 21 of the brewing chamber 6 thus form a unit, wherein the interior 21 of the brewing chamber 6 and the interior of the capsule 15 are separated from each other by the screen 31 (FIG. 2). The interior 21 of the brewing chamber 6 is several times larger than an interior of the capsule 15, e.g. more than four times as large, so that the brewing beverage is mainly located in the brewing chamber 6 and only a smaller part in the capsule 15, which simplifies the dispensing of the brewed beverage.

In the brewing position, hot water from the heating device is introduced into the brewing chamber 6 via the inlet line 13, for which purpose a nozzle 14 is provided at the end of the inlet line 13, which protrudes with a tip into the interior 21 of the brewing chamber 6. The brewing chamber 6 without a capsule can have a volume of between 0.1 to 1.0 L, in particular 0.15 to 0.7 L, depending on the number of brewing drinks to be produced. The brewing chamber 6 has an outlet 22 at the lower end which is connected via a line 24 to a valve 23. By closing the valve 23, the introduced hot water is collected in the brewing chamber 6 and rises above the outlet 22 in order to reach the material contained in the capsule 15 for brewing a beverage, in particular tea. By prior reading of the coding on the capsule 15 by a reading device 35, the preparation of the brewed beverage can be adjusted individually via the controller, e.g. green tea can be prepared differently than black tea, fruit tea or another brewing or infusion beverage.

After the brewing process, the valve 23 can be opened so that the brewing beverage from the brewing chamber 6 flows via the outlet 22, the line 24 into an outlet port 25, from which it is introduced into a vessel 4. Between the outlet port 25 and the vessel 4 there is a passage 26 and an opening, so that the hot beverage can flow in an unhindered manner into the vessel 4. After the preparation of the brewed beverage, the valve 23 can be closed.

After the output of the beverage, the brewing chamber 6 can be moved via the drive device 8 away from the capsule 15, so that the capsule 15 is removed from the holding position adjacent to the lateral opening 20 on the brewing chamber 6 and falls down. The capsule 15 falls into the collecting container 2 on a screen 29 or a mesh, which is arranged above a collecting reservoir 28. By moving the brewing chamber 6, the line 24 and the outlet port 25 are also moved simultaneously, which is now no longer disposed over the passage 26, but over a guide element 27. Now, the brewing chamber 6 and all lines wetted with tea can be rinsed by injecting hot water from the heater via the nozzle 14 into the brewing chamber 6, so that the hot water can remove residues of the brewing process. The hot water can be partially introduced directly through the opening 20 into the collecting container 2 and is otherwise introduced via the outlet 22 and the line 24 into the outlet port 25. From there, the rinsing water reaches the guide element 27, which is formed as an inclined bottom above the vessel 4. The rinsing water reaches the collecting reservoir 28 of the collecting container 2. The guide element 27 may be formed as a channel or gutter instead of a sloping bottom.

FIG. 2 schematically shows a capsule 15 which is arranged on the reading device 35. The capsule 15 has on a side wall 11 an upper edge 16, on which a capsule opening 12 is provided. The capsule opening 12 is closed at an upper side by a screen 31, so that an extractable substance cannot escape from the capsule 15. In the cup-shaped capsule 15, the terms "top" and "bottom" are used as shown in FIG. 2, wherein the capsule 15 can be used, of course, in any other rotated position when in use.

On the side opposite the capsule opening 12, the reading device 35 is provided on the bottom 18. The reading device 35 comprises a light source 40, which is arranged centrally on the bottom 18. From the light source 40, light is irradiated to an inlet surface 41 in the center of the bottom 18, which is distributed in the light guide 45. For this purpose, a first centrally disposed light deflection device 42 is provided, by means of which the incoming light rays, which impinge substantially perpendicularly on the plane of the bottom 18, are deflected approximately at right angles and guided through light guides. Spaced apart from the first light deflection device 42 a plurality of second light deflection devices 43 are provided which ensure that light is deflected by the first light deflection device 42 and directed to an outlet surface 44 at the bottom 18.

The outlet surface 44 is arranged opposite an opening 46 or a window at a diaphragm 47. Through the opening 46, the light passes to a light detector 36 of the reading device 35. The light detector 36 is arranged protected behind a disc 38.

A plurality of outlet surfaces 44 are provided at the bottom 18, preferably between two and eight outlet surfaces 44, in particular four outlet surfaces 44, so that a light detector 36 is provided on the reading device 35 for each outlet surface 44. The light detectors 36 are held on a carrier 37 and connected to a controller of the device 1.

It is obviously also possible to provide four light sources instead of one light source 40, which are arranged adjacent to the outlet surfaces 44. Then the outlet surfaces 44 become inlet surfaces for the light and the centrally arranged inlet surface 41 becomes an outlet surface. It is then only necessary to arrange one single light detector adjacent to the central inlet surface 41, which then becomes the outlet surface. The radiation direction of the light is reversed in this embodiment. In this case, the irradiation of the light can take place in succession, so that the readout of the individual light guides 45 can be carried out separately.

If light is irradiated via the light source 40 into the bottom 18, a predetermined type of capsule can be detected, which is formed in a selectively transparent manner relative to the outlet surfaces 44, so that at the light detector 36 reflective light is detected, or the outlet surface 44 has a reduced light transmission. For this purpose, a cover 48, a label, coating or other means to reduce light transmission can be provided at the outlet surface 44. For this purpose, the surface may also be changed mechanically, thermally or chemically, so that the adjacently arranged light detector 36 receives no reflected light.

In order to reduce the light transmission, it is also possible to provide the light guide with appropriate means, e.g. by one or more incisions. These means on the light guide can also be used for coding the capsule.

Thus, a particular type of capsule is detected via the reading device 35, so that for the brewing process the temperature of the water to be introduced into the brewing chamber 6 and/or the brewing time or other parameters, such as the exposure time of the cleaning agent, can be controlled. For example, it may be useful for an effective cleaning process to choose the exposure time after the introduction of hot water for at least 1 minute, preferably between 2 and 6 minutes. During the exposure time, the liquid level of the dissolved cleaning agent then remains constant in the brewing chamber.

Figure 3A:
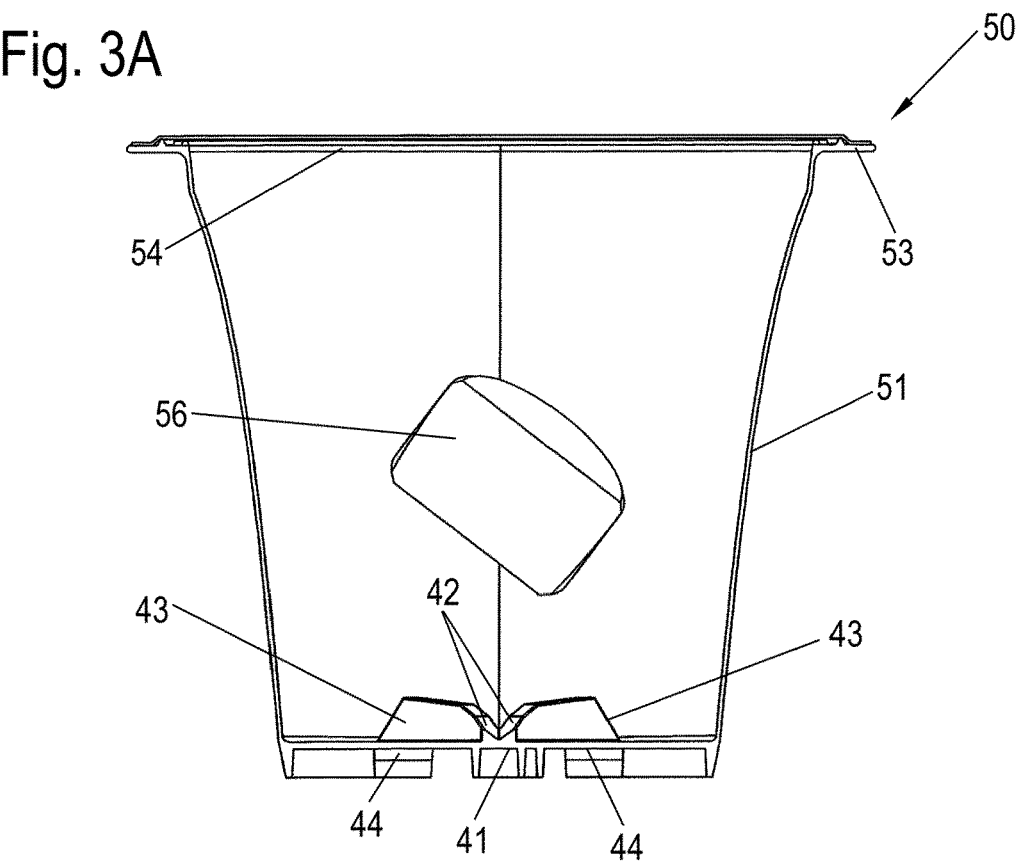
FIGS. 3A and 3B show two views of a capsule according to the invention for cleaning a beverage preparation machine.
Figure 3B:
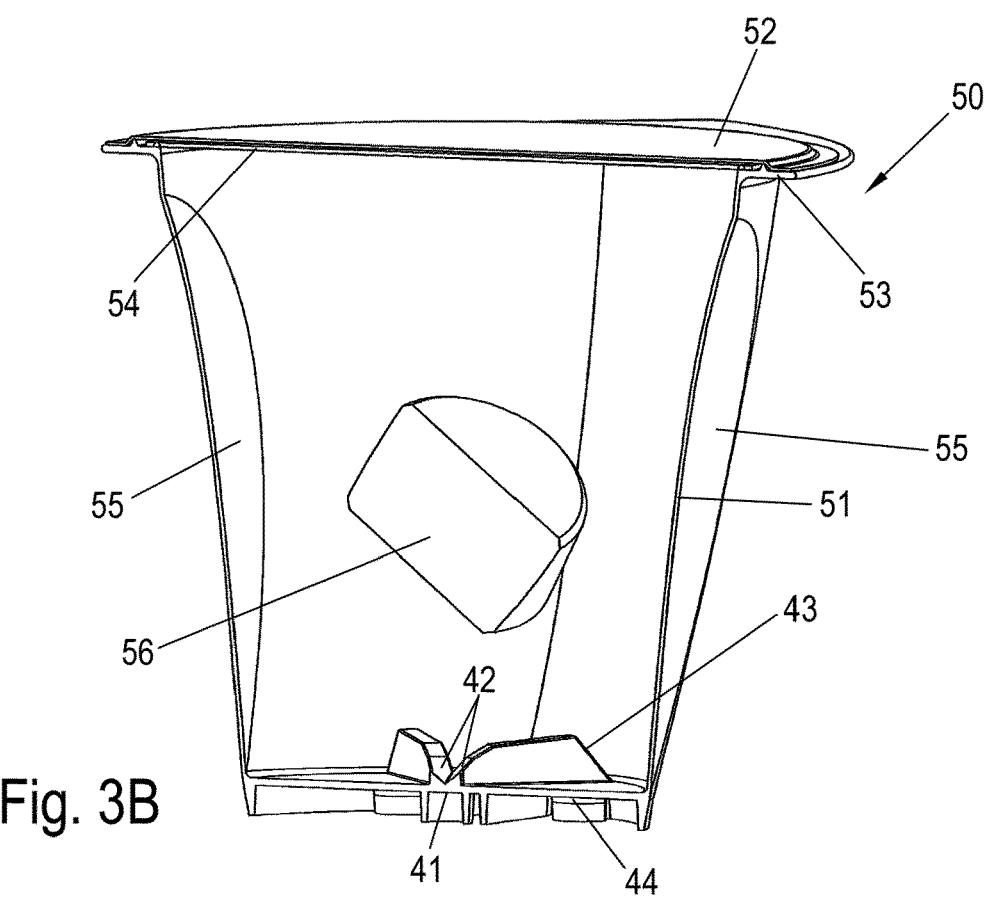

In FIGS. 3A and 3B, a capsule 50 is shown, which is designed as a cleaning capsule and, similar to the capsule 15, can be inserted into the insertion chute 7 of the beverage preparation machine of FIG. 1. The capsule 50 comprises a cup-shaped container 51, which on an upper side is sealed by a detachable cover 52. The cover 52 is fixed in this case to an outwardly projecting edge 53 of the container 51, in particular sealed. The cover 52 may be formed as an air- and water-impermeable film, for example made of plastic or aluminum. The cover 52 may optionally also be formed as a water-soluble film.

Below the cover 52, a screen 54, a mesh or an at least partially water-soluble film is provided, which also covers the opening of the container 51. The screen 54 is fixed to the outwardly projecting edge 53 and ensures that a cleaning agent 56 remains in an interior of the capsule 50, even if the cover 52 has been peeled off. The screen 54 is designed to be air- and water-permeable and thus allows access to the interior of the container 51.

The container 51 further has flattened portions 55 which serve to allow insertion of the capsule 50 in a predefined position into the insertion chute 7. Other guide means for positioning the capsule 50 on the insertion chute 7 may be provided.

At a bottom of the capsule, the inlet surfaces 41 and outlet surfaces 44 which are shown schematically in FIG. 2 are provided, wherein they are coupled to each other via two light deflection devices 42 and 43 in such a way that incoming light beams are passed through the two light deflection devices 42 and 43 to the outlet surfaces 44, so that emergent light at the outlet surfaces 44 can be detected by a light detector 36 (FIG. 2) of the reading device 35. It is also possible to provide a respective light source on the outlet surfaces 44, by means of which light can then be passed via the light deflection devices 42 and 43 to the central inlet surface 41 in order to then provide a light detector of reading device adjacent to the inlet surface 41. The inlet surface and the outlet surfaces 44 and the light deflection devices 42 and 43 form identification means, so that the device 1 detects which type of capsule is located on the brewing chamber 6.

When a capsule 50 is positioned as a cleaning capsule in the insertion chute 7 of the device of FIG. 1 adjacent to the brewing chamber 6, hot water is first introduced into the brewing chamber 6 for a cleaning operation, which then flows through the open screen 54 into the container 51. The cleaning agent is thus dissolved and is available for the cleaning process.

The cleaning agent 56 may be in tablet form and contain one or more active ingredients, which are dissolved simultaneously or else with a time delay after each other. Preferably, various active agents are provided, which are dissolved successively, as is known for dishwasher tablets. Then, the cleaning of the brewing chamber can occur in different cleaning steps, wherein one or more times hot water can be introduced into the brewing chamber 6. The introduced water can in each case have different temperatures. After the cleaning process, the brewing chamber 6 is then rinsed, wherein the capsule 50 remains at the brewing chamber 6 and is also flushed through. The cleaning can be done according to an automatic cleaning program that controls the amount of liquid, the temperature and the time for the cleaning process. The cleaning process can take place in one or more stages, e.g. with cleaning and additional decalcification. After the cleaning process, the capsule 50 is then removed, a final end rinse is carried out and the device 1 can be used for the preparation of other beverages.

In the illustrated embodiment, a cup-shaped container 51 is provided with a cleaning agent 56. It is also possible to provide the cleaning agent 56 only in a partial region of the container 51, wherein the regions can be subdivided via one or more partition walls.

The invention claimed is:

1. A capsule for cleaning a beverage preparation machine, comprising:
   a cup-shaped container having a bottom, a side wall and an upper side with an opening and an outwardly projecting edge surrounding the opening;
   a releasable cover arranged to seal the upper side of the container;
   at least one cleaning agent disposed in the container; and
   one of a screen, a mesh and a water-soluble film arranged on the container underneath the cover and fixed to the outwardly projecting edge to hold the cleaning agent within the container,
   wherein the capsule includes at the bottom at least one identification with an inlet surface with a first light deflection device configured to deflect incoming light rays and a second light deflection device configured to deflect incoming, light rays from the first light deflection device to an outlet surface for light.

2. The capsule according to claim 1, wherein the screen or mesh is water permeable to allow dissolving of the cleaning agent by inflow of water into the container.

3. The capsule according to claim 1, wherein the cleaning agent comprises at least one of a cleaning tablet, cleaning granulate and powder.

4. The capsule according to claim 3, wherein the cleaning agent comprises a cleaning tablet that contains at least two active substances which are successively effective in a time-delayed manner when dissolved.

5. A method for cleaning a brewing chamber of a beverage preparation machine, utilizing the capsule of claim 1, comprising the following steps:
   removing the cover on container of the capsule having a cleaning agent disposed therein;
   positioning the capsule on or in the brewing chamber;
   introducing hot water substantially pressurelessly into the brewing chamber and the capsule, and dissolving the cleaning agent;
   distributing the cleaning solution by flow and convection within the capsule and brewing chamber;
   allowing the dissolved cleaning agent to act in the brewing chamber; and
   rinsing the brewing chamber.

6. The method according to claim 5, wherein the allowing step includes exposing for at least 1 minute the brewing chamber and capsule to the dissolved cleaning agent after introduction of the hot water.

7. The method according to claim 6, including during the exposing time, maintaining a filling level of the cleaning agent dissolved in water in the brewing chamber substantially constant.

8. The method according to claim 5, wherein the rinsing of the brewing chamber occurs with the capsule positioned on or in the brewing chamber.

9. The method according to claim 5, wherein the positioning step includes positioning the capsule at a lateral opening of the brewing chamber.

10. The method according to claim 5, wherein the introducing step includes introducing the hot water into the capsule without perforating the capsule such that the introducing of the hot water takes place solely via the screen, mesh or an at least partially dissolved soluble film.

11. The method according to claim 5, wherein the cleaning agent contains at least two active ingredients, and the dissolving step includes dissolving the two active ingredients successively in a time-delayed manner.

12. The method according to claim 5, further including, before or after the positioning of the capsule on the brewing chamber, automatically detecting the capsule by at least one light source and at least one light detector, which interact with an identification on the capsule.

* * * * *